(12) United States Patent
Beimdieck et al.

(10) Patent No.: US 10,109,395 B2
(45) Date of Patent: Oct. 23, 2018

(54) CONNECTION UNIT FOR AN ACTIVELY COOLED CABLE

(71) Applicant: HARTING Automotive GmbH, Espelkamp (DE)

(72) Inventors: Carsten Beimdieck, Bramsche (DE); Alexander Bruland, Rahden (DE)

(73) Assignee: HARTING Automotive GmbH, Espelkamp (DE)

(*) Notice: Subject to any disclaimer, the term of this patent is extended or adjusted under 35 U.S.C. 154(b) by 0 days.

(21) Appl. No.: 15/703,686

(22) Filed: Sep. 13, 2017

(65) Prior Publication Data

US 2018/0075946 A1 Mar. 15, 2018

(30) Foreign Application Priority Data

Sep. 14, 2016 (DE) .................... 10 2016 117 261

(51) Int. Cl.
| | | |
|---|---|---|
| *H01B 7/42* | (2006.01) | |
| *H02G 3/03* | (2006.01) | |
| *B60L 11/18* | (2006.01) | |
| *H01R 13/00* | (2006.01) | |

(52) U.S. Cl.
CPC .......... *H01B 7/423* (2013.01); *B60L 11/1816* (2013.01); *B60L 11/1818* (2013.01); *H01R 13/005* (2013.01); *H02G 3/03* (2013.01); *B60L 2230/12* (2013.01)

(58) Field of Classification Search
CPC ........ H01R 9/11; H01R 13/005; H01B 9/001; H01B 7/423; H01B 7/425; F16L 25/01; H02G 3/03
USPC ........ 439/190, 192, 194, 196, 203, 205, 206
See application file for complete search history.

(56) References Cited

U.S. PATENT DOCUMENTS

| | | | |
|---|---|---|---|
| 3,324,225 A * | 6/1967 | Thostrup ............ | B23K 9/173 174/15.7 |
| 5,248,868 A * | 9/1993 | Cusick, III .......... | B23K 9/295 219/136 |
| 5,591,937 A | 1/1997 | Woody et al. | |
| 6,100,467 A * | 8/2000 | Kroulik .............. | H01B 7/425 174/15.1 |
| 7,481,662 B1 * | 1/2009 | Rehrig .............. | B23K 9/287 439/198 |
| 2003/0226680 A1 * | 12/2003 | Jackson ............ | H02G 15/04 174/655 |
| 2012/0199390 A1 | 8/2012 | Oka et al. | |
| 2014/0243206 A1 | 8/2014 | Crook et al. | |

FOREIGN PATENT DOCUMENTS

| | | |
|---|---|---|
| DE | 42 09 928 C1 | 12/1992 |
| DE | 10 2010 050 562 B3 | 4/2012 |
| DE | 10 2015 101 076 A1 | 7/2016 |
| WO | 2012/051510 A2 | 4/2012 |

\* cited by examiner

*Primary Examiner* — Ross Gushi

(74) *Attorney, Agent, or Firm* — Seed IP Law Group LLP

(57) ABSTRACT

A connection unit for a fluid-cooled electric cable is provided, the connection unit comprising a housing, which has a cable connecting opening, a fluid inlet opening and a fluid outlet opening.

15 Claims, 2 Drawing Sheets

CONNECTION UNIT FOR AN ACTIVELY COOLED CABLE

BACKGROUND

Technical Field

This disclosure relates to a connection unit for a fluid-cooled cable, and additionally relates to a system composed of a plug-in connector, a fluid-cooled cable and a connection unit.

Description of the Related Art

Fluid-cooled cables are employed, in particular, to carry high currents, and are used, for example, for connecting charging plug-in connectors.

In the case of electric vehicles, there is a need for rapid charging of the battery, if this technology is to prevail over conventional vehicles that have an internal combustion engine. The vehicles having an internal combustion engine can have their fuel tanks filled up completely within a few minutes. Electric vehicles must be able to compete with this. For rapid charging operations, particularly high currents must be used, resulting in a large amount of heat being produced in the charging plug-in connectors.

In the case of so-called active cooling, the fluid-cooled cooled cables must be connected to a cooling unit, in which the cooling fluid, heated by a charging plug-in connector, is cooled down again, or conditioned. At the same time, the fluid-cooled cable must be supplied with electric current and connected accordingly. The connecting of such a cooled cable is complex and time-consuming.

DE 2010 050 562 B3 shows a charging plug-in connector for electric vehicles. The heating of the plug-in connector that is generated during the charging operation is reduced by a spiral-shaped fluid line, which runs substantially in the handle region of the plug-in connector. A cooling fluid flows, in a closed cooling circuit, through the fluid line. The fluid line runs parallel to the electric cable. Thus, the electric cable and the cooling fluid line must be connected separately. The cooling of the cable by a cooling fluid line that is routed in parallel is not very effective. Moreover, such a structure is not space-saving, which may result in problems, particularly in the confined area of a filling station.

BRIEF SUMMARY

Embodiments of the present invention provide a compact connection possibility for a fluid-cooled electric cable having a charging plug-in connector connected thereto. Moreover, the time required for connecting such a cable is to be reduced.

The connection unit according to embodiments of the present invention is designed for connecting a fluid-cooled electric cable. The connection unit has a housing, which has a cable connecting opening, a fluid inlet opening and a fluid outlet opening.

The fluid-cooled electric cable is connected at one end to an electric plug-in connector, preferably a charging plug-in connector. The other end of the fluid-cooled electric cable is connected to the connection unit according to embodiments of the present invention. The plug-in connector—in combination with the cable connected thereto—can be supplied equally with cooling fluid and current.

The cable connected to the connection unit has, in cross section, a central cooling fluid line. Individual conductors, in this case copper cores, are positioned around the cooling fluid line. The copper cores are surrounded by a fluid-tight film. Lying on this film are so-called buffer elements, which are ultimately surrounded by a solid cable sheath. The buffer elements are hollow, such that cooling fluid can flow in the region between the fluid-tight film and the cable sheath.

Preferably, the connection unit can be connected to a cooling unit for a cooling fluid. The cooling fluid moves in a closed circuit between the plug-in connector and the cooling unit. In the cooling unit, the cooling fluid is conditioned, in that, after having been heated in the charging plug-in connector, it is cooled down again.

Preferably, the connection unit can be connected to a stationary charging column for an electric vehicle. This stationary charging column may comprise the above-mentioned cooling unit. At the same time, the current charging an electric vehicle is provided via the charging column. The active cooling during the charging operation makes it possible to achieve a very short charging time for electric vehicles.

Preferably, in the case of the connection unit, the cable connecting opening and the fluid outlet opening are oriented parallel to each other. The fluid heated by the charging operation can thus be returned on the direct path into the cooling unit.

In a preferred variant embodiment of the invention, the fluid inlet opening is oriented perpendicularly in relation to the cable connecting opening and/or in relation to the fluid outlet opening. Preferably, the fluid inlet opening is disposed closer to the fluid outlet opening than to the cable connecting opening. In the case of such an arrangement, the fresh fluid flowing in via the fluid inlet opening can already easily cool the heated fluid flowing out via the fluid outlet opening. Tests have shown that such an arrangement works particularly effectively, since the heated fluid can be cooled down again very rapidly.

It is particularly advantageous if the fluid outlet opening comprises an electric contact element that can be connected inside the housing to a fluid-cooled electric cable. The contact element enables the electrical connection to be effected inside the housing of the connection unit, favoring a compact design of the connection unit.

Advantageously, the connection between the fluid-cooled electric cable and the contact element is realized by a crimp sleeve. The crimp sleeve also enables the copper conductor of the cable to be connected to the contact element of the fluid outlet opening in a media-tight manner.

Preferably, the fluid-cooled electric cable described above projects into the cable connecting opening. The cable connecting opening is closed in a media-tight manner by a screwed cable gland.

The connection unit described above can be used particularly advantageously with a plug-in connector, preferably with a charging plug-in connector, and a fluid-cooled cable.

Advantageously, the fluid-cooled cable, in cross section, has a central cooling fluid line, with individual conductors, preferably copper cores, being positioned around the cooling fluid line. The copper cores are preferably surrounded by a fluid-tight film, with buffer elements, which are surrounded by a solid cable sheath, lying on the fluid-tight film. The buffer elements are ideally of a hollow design, such that a cooling fluid can flow in the region between the fluid-tight film and the cable sheath.

The charging plug-in connector of the system described above has at least one electric contact element, which has a contact part and a connection part, the connection part being connectable to an electric conductor of a cable, cooling fluid being able to be supplied to the contact element via the fluid-cooled cable.

BRIEF DESCRIPTION OF THE SEVERAL VIEWS OF THE DRAWINGS

An exemplary embodiment of the invention is represented in the drawings and explained in greater detail in the following. There are shown.

The figures contain partly simplified schematic representations. In some cases, identical references are used for elements that are similar, but possibly not identical. Differing views of similar elements may differ in their scale.

DETAILED DESCRIPTION

Figure 1:
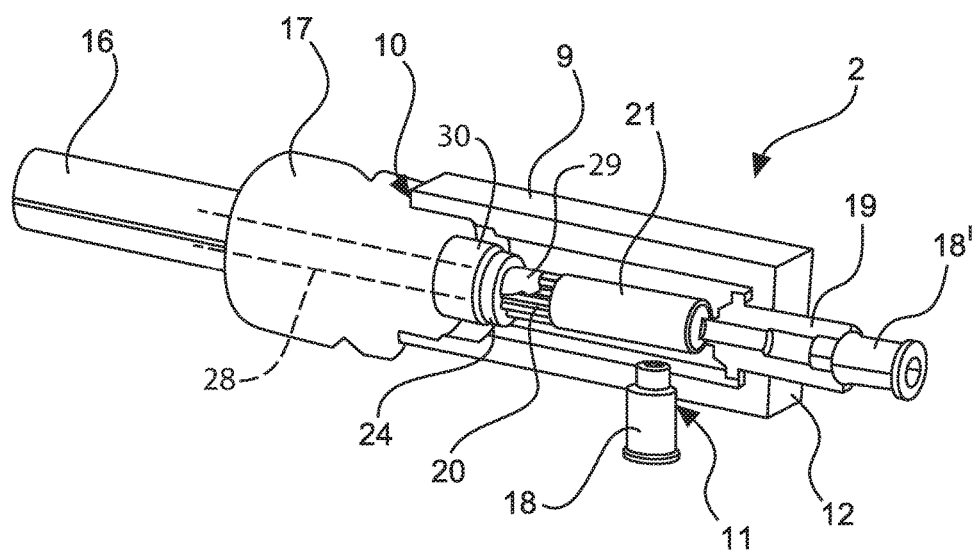
FIG. 1 a partly sectional perspective representation of a connection unit.

FIG. 1 shows a connection unit 2, by which a charging plug-in connector 5 can be connected to a charging column 8. The connection unit 2has a box-shaped housing 9 that, in turn, has three openings, a cable connecting opening 10, a fluid inlet opening 11 and a fluid outlet opening 12. In the cable connecting opening 10, a fluid-cooled cable 16 is fastened by a screwed cable gland 17. The fluid-cooled cable 16, in cross section, has a central cooling fluid 28, with individual conductors, preferably copper cores 20, being positioned around the cooling fluid line 28. The copper cores 20 are preferably surrounded by a fluid-tight film 29 (partially shown), with buffer elements 24, which are surrounded by a solid cable sheath 30, lying on the fluid-tight film 29. The buffer elements 24 are ideally of a hollow design, such that a cooling fluid can flow in the region between the fluid-tight film 29 and the cable sheath 30.The fluid outlet opening 11 is provided with a fluid connecting piece 18. The fluid outlet opening 12 contains an electric contact element 19 that, inside the housing 9, is connected to the copper cores 20 of the cable 16 by a crimp sleeve 21.

The contact element 19—in a manner similar to the contact element 1 described further below—has a hollow cylinder (not visible in FIG. 1), which is inserted into the central cooling fluid line of the cable 16. Made in the contact element 19 there is a through-bore, which is continued on the outside in a fluid connecting piece 18'. Via the latter, fluid heated in the charging plug-in connector 5 can flow out. The contact element 19 has an external thread (not shown) and, by means thereof, can be connected, in combination with a nut, for the purpose of electrical interfacing, to a conductor bar 22. The end face of the contact element 19 and the end face of the nut each have knurls, which prevent twisting, or loosening. A reliable electrical connection is thereby ensured. The contact element 19 and the associated nut are composed, not of steel, but of a particularly conductive material having a high proportion of copper. This ensures that the connection has both durability and mechanical strength.

The connection unit 2 can be connected to a cooling unit 23 of the charging column 8 via the fluid connecting pieces 18, 18'.

Figure 2:
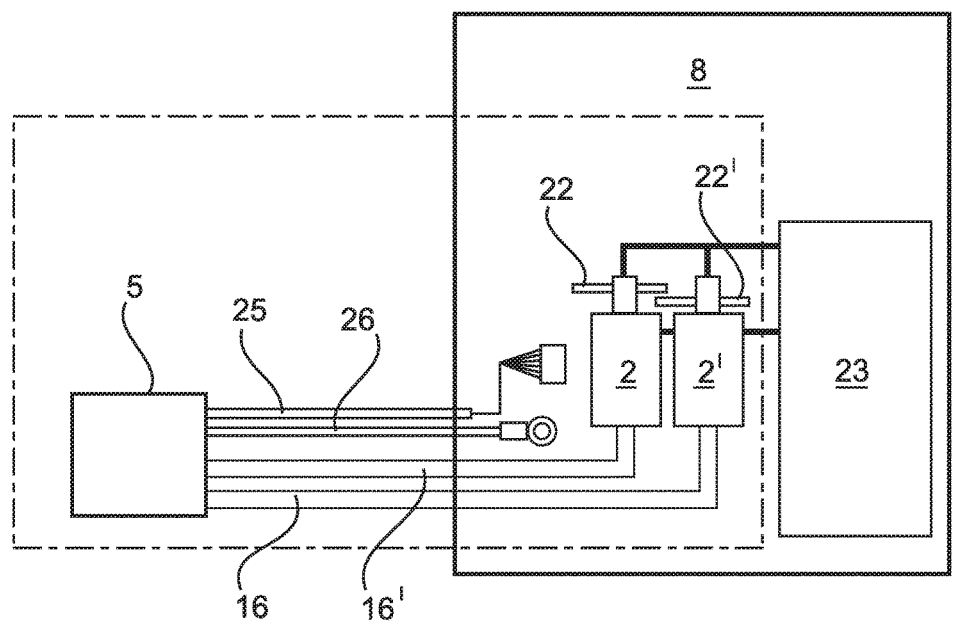
FIG. 2 a schematic representation of a charging plug-in connector connected to a charging column via the connection unit, FIG. 3 a perspective representation of a contact element of the charging plug-in connector, and FIG. 4 a partly sectional perspective representation of a charging plug-in connector.
Figure 3:
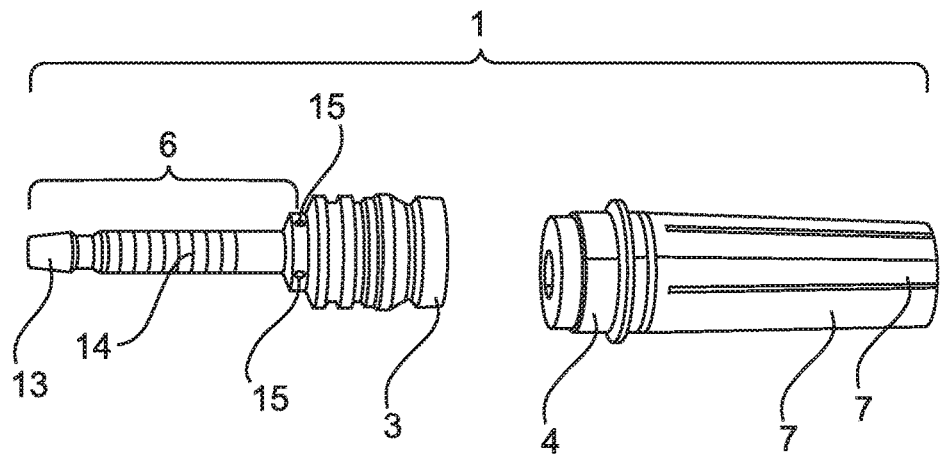

It can be seen from FIG. 2 that a connection unit 2, which is connected to a charging column 8, is also provided for each fluid-cooled contact 1 in the charging plug-in connector 5. No further connection units are required for further contact elements that, for example, carry signal currents or are provided for earthing.

In the fluid inlet opening 11, a fresh fluid, at a low temperature, is introduced into the connection unit 2. Via the hollow buffer elements 24, the fluid can reach the contact element 1 of the charging plug-in connector 5. There, the fluid takes up the heat, or the thermal energy, produced during the charging operation. The heated fluid is transported, via the central fluid line of the cable 16, to the fluid outlet opening 12, and undergoes further conditioning in the cooling unit 23, i.e., it is cooled down again.

In the charging plug-in connector 5 there is at least one incorporated fluid-cooled contact element 1. The contact element 1 is composed of a connection part 3 and a contact part 4. The connection part 3 includes an axial bore, and the contact part 4 includes an axial through-bore. Both the bore and the through-bore each have an internal thread, and can be reversibly connected to each other by a screw (not shown). The contact part 4 is realized as a so-called socket, having a total of 6 segments 7. The connection part 3 is substantially cylindrical in form. Projecting axially from the main body there is a formed-on hollow cylinder 6. The hollow cylinder 6 may also be regarded as a hollow needle. The hollow cylinder 6 tapers towards the end, and goes into an outlet opening 13. Between the outlet opening 13 and the main body there is segment structure 14 applied to the hollow cylinder 6. In the connection part 3 there are openings 15, which form an access to a cavity inside the connection part 3. The cavity 16 is likewise connected to the cavity formed by the hollow cylinder 6.

The outlet opening 13 of the hollow cylinder 6 is inserted into the central cooling fluid line of the cable. The cooling fluid flows into the openings 15 of the connection part 3. The cooling fluid flows through the said cavity of the connection part 3. Here, the heat produced during operation is taken up by the cooling fluid and, via the cavity of the hollow cylinder 6, is taken away again via the central fluid line. In a remote cooling unit, the cooling fluid can be cooled down again and, in a closed circuit, supplied back to the openings 15.

Connected to the charging plug-in connector 5 there is a signal cable 25, via which the charging plug-in connector 5 is supplied with various control signals. Furthermore, there is an earthing cable 26 connected to the charging plug-in connector 5.

Figure 4:
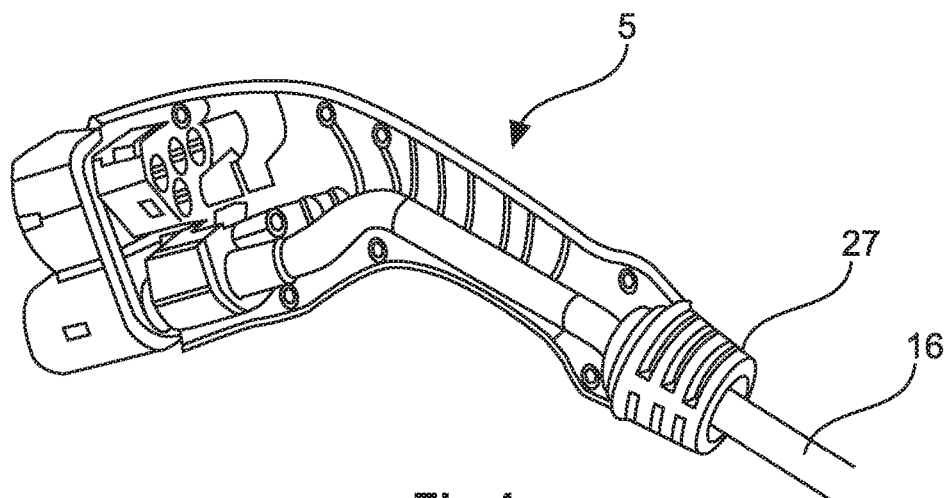

FIG. 4 shows a charging plug-in connector 5, which, or the contact element 1 of which, is connected to a fluid-cooled cable 16. Normally, the charging plug-in connector 5 has a plurality of fluid-cooled contact elements 1. Each contact element 1 is then respectively connected to a fluid-cooled cable 16. The fluid-cooled cables 16 and further cables are combined in a flexible tube (not shown, for illustrative reasons), which goes out from the cable outlet 27 of the charging plug-in connector 5.

This application claims priority to German Patent Application No. 10 2016 117 261.8, filed Sep. 14, 2016, the entire contents of which are hereby incorporated by reference.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system comprising:
a fluid-cooled electric cable having a central cooling fluid line surrounded by hollow buffer elements, the central cooling fluid line and the hollow buffer elements extending along a length of the fluid-cooled electric cable from a first end to a second end opposite the first end; and
a connection unit comprising a housing, which has a cable connecting opening, a cooling fluid inlet and a cooling fluid outlet,
wherein the first end of the fluid-cooled electric cable is coupled to the housing of the connection unit at the cable connecting opening,
wherein the cooling fluid inlet of the housing is in fluid communication with the hollow buffer elements at the first end of the fluid-cooled electric cable within the housing to supply cooling fluid to the second end of the fluid-cooled electric cable via the hollow buffer elements, and
wherein the cooling fluid outlet of the housing is in fluid communication with the central cooling fluid line at the first end of the fluid-cooled electric cable within the housing to enable the cooling fluid to be discharged from the housing after the cooling fluid returns from the second end of the fluid-cooled electric cable via the central cooling fluid line.

2. The system according to claim 1, wherein the connection unit is configured to be connected to a stationary charging column for an electric vehicle.

3. The system according to claim 1, wherein the connection unit is configured to be connected to a cooling unit for the cooling fluid.

4. The system according to claim 1, wherein the cable connecting opening and the cooling fluid outlet are oriented parallel to each other.

5. The system according to claim 1, wherein the cooling fluid inlet is oriented perpendicularly in relation to the cable connecting opening and/or in relation to the cooling fluid outlet.

6. The system according to claim 1, wherein the cooling fluid outlet comprises an electric contact element that is adapted to be connected inside the housing to the fluid-cooled electric cable.

7. The system according to claim 6, wherein the connection between the fluid-cooled electric cable and the electric contact element is realized by a crimp sleeve.

8. The system according to claim 1, wherein the fluid-cooled electric cable passes through the cable connecting opening and is engaged in a media-tight manner by a screwed cable gland.

9. The system according to claim 1, wherein the cooling fluid inlet is disposed closer to the cooling fluid outlet than to the cable connecting opening.

10. The system according to claim 1, further comprising a plug-in connector coupled to the second end of the fluid-cooled electric cable.

11. The system according to claim 10, wherein the fluid-cooled electric cable has, in cross section, the central cooling fluid line and individual conductors in the form of copper cores positioned around the central cooling fluid line.

12. The system according to claim 11, wherein the copper cores are surrounded by a fluid-tight film, and lying on the fluid-tight film there are the hollow buffer elements, which are surrounded by a solid cable sheath.

13. The system according to claim 12, wherein the hollow buffer elements are configured to enable the cooling fluid to flow in a region between the fluid-tight film and the solid cable sheath.

14. The system according to claim 10, wherein the plug-in connector has at least one fluid-cooled electric contact element.

15. The system according to claim 14, wherein the fluid-cooled electric contact element of the plug-in connector has a contact part and a connection part, the connection part being connectable to an electric conductor of the fluid-cooled electric cable, and the cooling fluid being able to be supplied to the fluid-cooled electric contact element of the plug-in connector via the fluid-cooled electric cable.

* * * * *